United States Patent
Yanagiya et al.

(10) Patent No.: US 11,826,938 B2
(45) Date of Patent: Nov. 28, 2023

(54) INJECTION APPARATUS

(71) Applicant: THE JAPAN STEEL WORKS, LTD., Tokyo (JP)

(72) Inventors: Takehiko Yanagiya, Tokyo (JP); Yutaka Nakagawa, Tokyo (JP); Chikara Kawabe, Tokyo (JP); Takahiro Sugahara, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 154 days.

(21) Appl. No.: 17/371,095

(22) Filed: Jul. 8, 2021

(65) Prior Publication Data
US 2022/0032520 A1    Feb. 3, 2022

(30) Foreign Application Priority Data

Jul. 28, 2020  (JP) .................... 2020-127268

(51) Int. Cl.
*B29C 45/53* (2006.01)
*B29C 45/17* (2006.01)
*B29C 45/58* (2006.01)
*B29C 45/54* (2006.01)

(52) U.S. Cl.
CPC ........ *B29C 45/531* (2013.01); *B29C 45/1775* (2013.01); *B29C 45/54* (2013.01); *B29C 45/586* (2013.01)

(58) Field of Classification Search
CPC .... B29C 45/531; B29C 45/53; B29C 45/1775
See application file for complete search history.

(56) References Cited

U.S. PATENT DOCUMENTS

2014/0255536 A1*  9/2014  Yamaguchi ............. B29C 45/82
                                                        425/557

FOREIGN PATENT DOCUMENTS

| CN | 102852753 A | * | 1/2013 |
| CN | 204936098 U | * | 1/2016 |
| CN | 107756746 A | * | 3/2018 |
| JP | 2007-216285 A |   | 8/2007 |

OTHER PUBLICATIONS

Machine translation CN102852753A (Year: 2013).*
Machine translation CN107756746A (Year: 2018).*
Machine translation CN204936098U (Year: 2016).*

* cited by examiner

*Primary Examiner* — Matthew J Daniels
*Assistant Examiner* — Wayne K. Swier
(74) *Attorney, Agent, or Firm* — Potomac Law Group, PLLC

(57) ABSTRACT

An injection piston drives a screw. An injection hydraulic cylinder drives the injection piston and is partitioned into first and second chambers. A first oil discharge port is disposed in the injection hydraulic cylinder to be blocked by a piston part when the piston part of the injection piston advances to a pressure-holding switching position, and discharges hydraulic oil from the second chamber. A second oil discharge port is disposed in the injection hydraulic cylinder to be capable of discharging hydraulic oil from the second chamber regardless of the position of the injection piston. The injection piston has first and second members. The joint of the first and second members is disposed at a position separated from an end of the piston part on a side of the second chamber by a predetermined distance.

9 Claims, 10 Drawing Sheets

US 11,826,938 B2

INJECTION APPARATUS

INCORPORATION BY REFERENCE

This application is based upon and claims the benefit of priority from Japanese patent application No. 2020-127268, filed on Jul. 28, 2020, the disclosure of which is incorporated herein in its entire by reference.

BACKGROUND

The present disclosure relates to an injection apparatus and, for example, relates to an injection apparatus of a metal injection molding machine for performing injection molding of metal such as magnesium alloy and aluminum alloy.

Metal injection molding machines are widely used for molding products by filling a cavity in a mold with molten metal material. As an example of injection molding used in such a metal injection molding machine, it has been proposed that an injection apparatus of a metal injection molding machine having a configuration in which a speed of an injection piston is rapidly reduced to shift a process from an injection process to a pressure-holding process (Japanese Unexamined Patent Application Publication No. 2007-216285).

In this injection apparatus, an oil discharge port having a large opening and an oil discharge port having a small opening are disposed in a front chamber, and when the injection piston advances to a pressure-holding switching position, the oil discharge port having the large opening is blocked by the injection piston. As a result, the discharge of the hydraulic oil is greatly reduced, so that a sudden brake is applied to the injection piston, and the discharge for operation during the pressure-holding process can be performed through an oil discharge port having a small opening.

SUMMARY

However, in the above injection apparatus, there is a problem that an unbalanced load is applied to the injection piston when the injection piston decelerates. As described above, when the oil discharge port with a large opening is blocked by the injection piston, the pressure applied to a part of a side surface that is exposed to the oil discharge port becomes low. On the other hand, on a part of the side surface of the injection piston opposite to the part exposed to the oil discharge port, there is high-pressure hydraulic oil. Therefore, this pressure difference causes a problem that shear force or an eccentric load that is a force applied in a yaw direction are applied to the injection piston.

Other challenges and novel features will become apparent from the description herein and the accompanying drawings.

An injection apparatus according to an embodiment is an injection apparatus including: an injection piston configured to drive a screw movable and rotatable along an axial direction along the axial direction; an injection hydraulic cylinder configured to drive the injection piston in the axial direction, and to be partitioned into a first chamber and a second chamber to which hydraulic oil is supplied; a first oil discharge port configured to discharge the hydraulic oil from the second chamber, and to be blocked by a piston part when the piston part of the injection piston advances to a pressure-holding switching position; a second oil discharge port configured to discharge the hydraulic oil from the second chamber regardless of the position of the injection piston, in which the injection piston includes: a first member on a side of the first chamber; and a second member on a side of the second chamber and connected to the first member in the piston part, a joint between the first member and the second member is disposed in the piston part at a position separated from an end of the piston part on a side of the second member by a predetermined distance in the axial direction.

According to an embodiment, it is possible to provide an injection apparatus of a metal injection molding machine capable of advantageously protecting an injection piston.

The above and other objects, features and advantages of the present disclosure will become more fully understood from the detailed description given hereinbelow and the accompanying drawings which are given by way of illustration only, and that are not to be considered as limiting the present disclosure.

DESCRIPTION OF EMBODIMENTS

Figure 1:
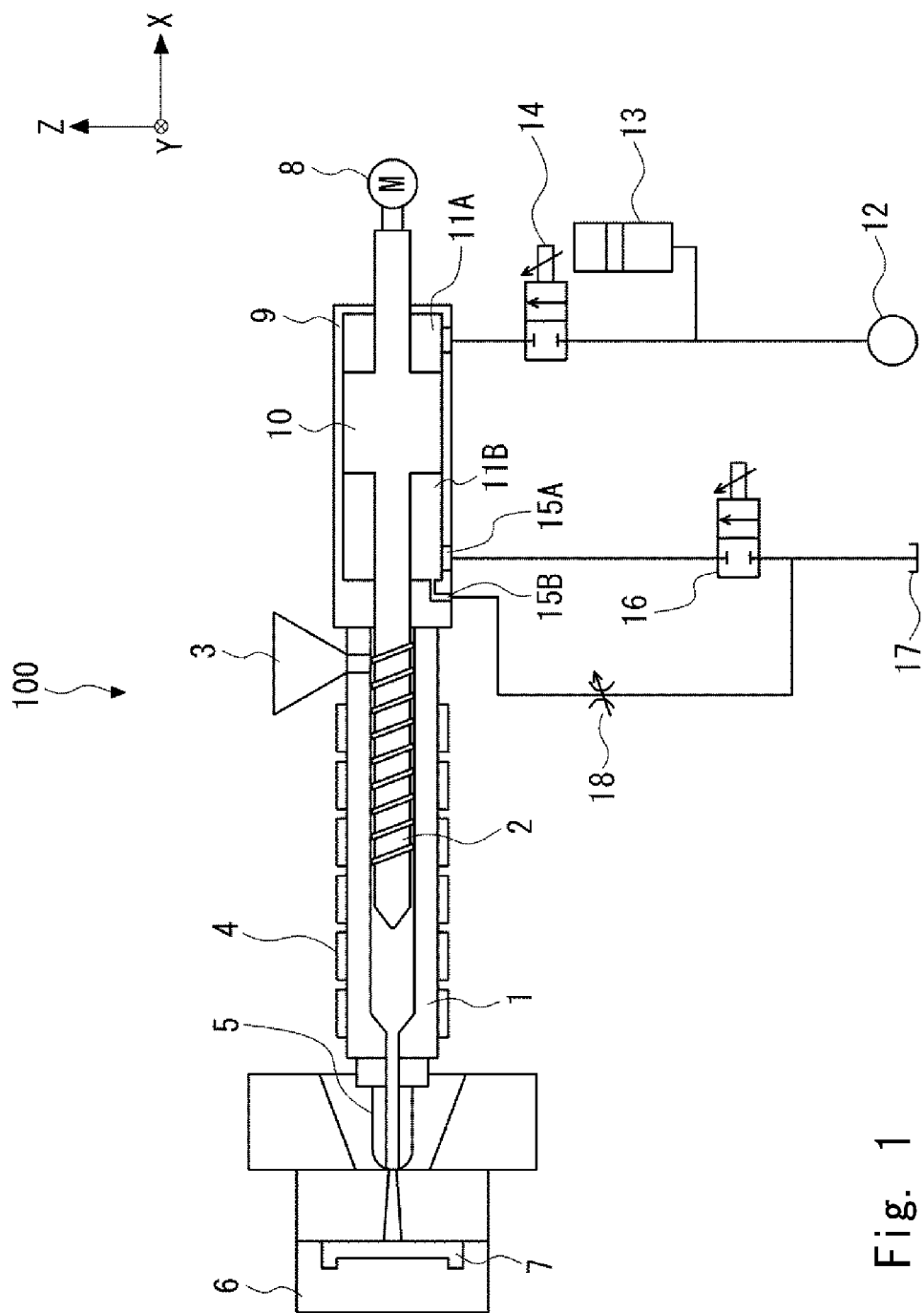
FIG. 1 is a diagram showing a schematic configuration of an injection apparatus of a metal injection molding machine according to a first embodiment.

Hereinafter, embodiments of the present disclosure will be described with reference to the drawings. However, the present disclosure is not limited to the following embodiments. In order to clarify the description, the following description and drawings are appropriately simplified. In addition, the same elements are denoted by the same reference numerals, and the redundant description will be omitted.

First Embodiment

Figure 6:
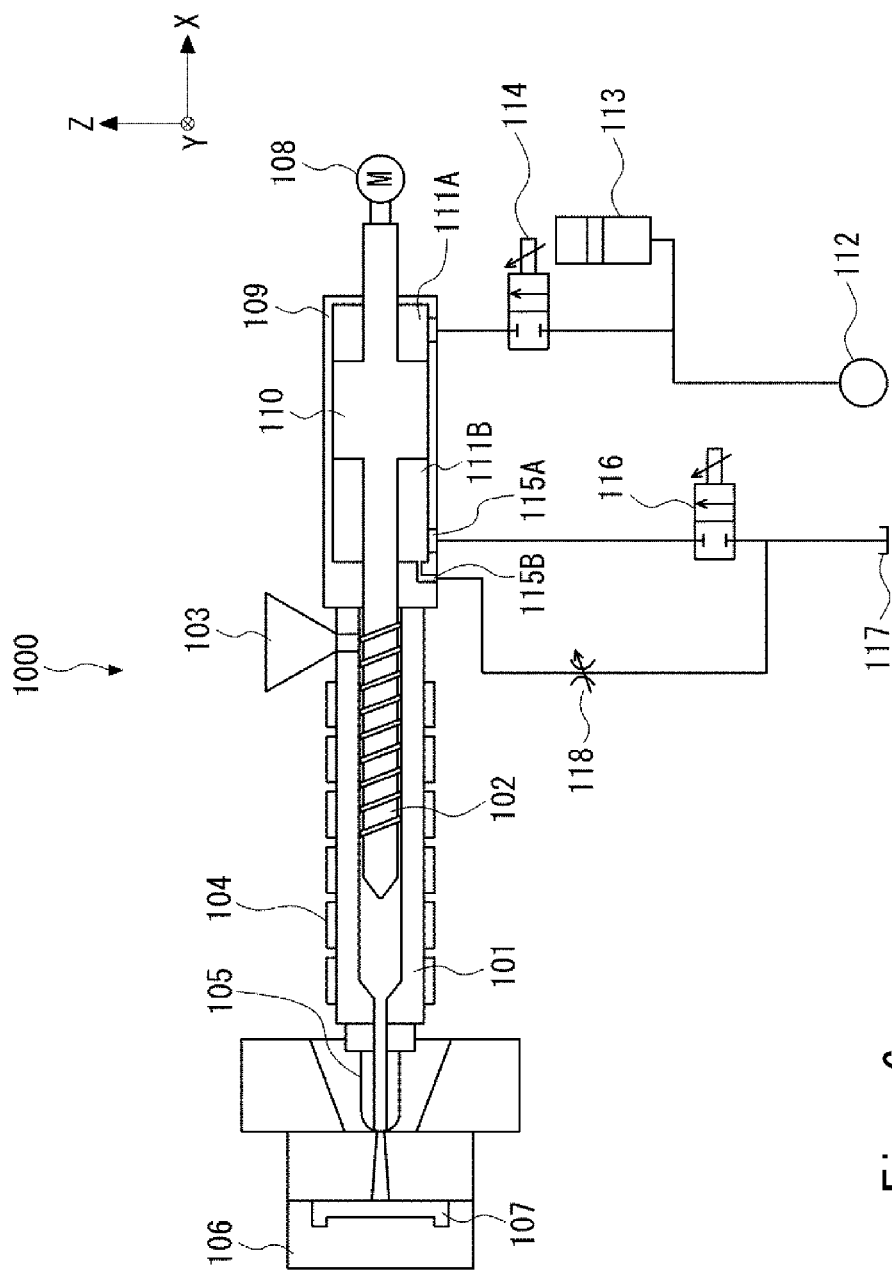
FIG. 6 is a diagram showing a schematic configuration of a general injection apparatus of a metal injection molding machine.

As a prerequisite to understand an injection apparatus of a metal injection molding machine according to the present embodiment, a general injection apparatus of a metal injection molding machine according to Japanese Unexamined Patent Application Publication No. 2007-216285 will be described. FIG. 6 shows a schematic configuration of an injection apparatus 1000 of the above metal injection molding machine. The injection apparatus 1000 includes a heating barrel 101 and a screw 102 disposed in the heating barrel 101 to be freely driven in an axial direction and a rotational direction. Molding material is charged from a hopper 103 into the heating barrel 101, and the charged material is molten by frictional heat, shear heat generated due to rotation of the screw 102, and heat applied from a heater 104 disposed on the outer periphery of the heating barrel 101. The molten material is kneaded by the rotation of the screw 102 and sent to the front of the heating barrel 101. A nozzle 105 is attached to a tip of the heating barrel 101. When the material is injected, the molten molding material held at the tip of the heating barrel 101 is injected through the nozzle 105 into a cavity 107 of a mold 106 that is closed.

The screw 102 is rotationally driven by a motor 108 and axially driven by an injection piston 110 disposed in an injection hydraulic cylinder 109.

The injection hydraulic cylinder 109 is partitioned into two chambers by the injection piston 110, a front chamber 111B is disposed in the front (−X direction), and a rear chamber 111A is disposed in the rear (+X direction). The pressure oil accumulated in the accumulator 113 is supplied to the rear chamber 111A through a flow control valve 114 by a hydraulic pump 112.

Figure 7:
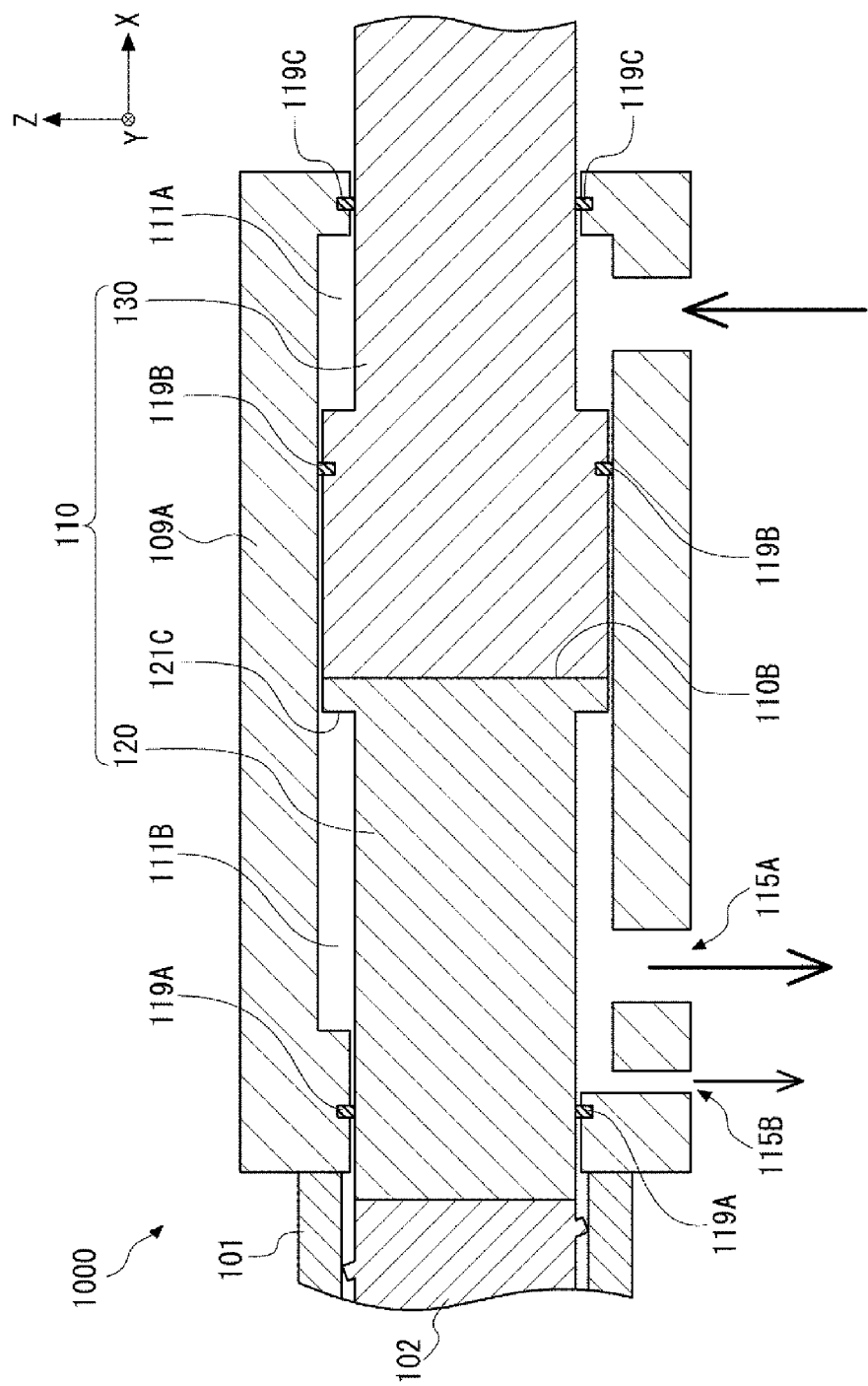
FIG. 7 is an enlarged view near a front chamber of the general injection apparatus.

FIG. 7 is an enlarged view in the vicinity of the front chamber 111B of the injection apparatus 100. In the front chamber 111B, a first oil discharge port 115A that is completely or mostly blocked by the injection piston 110 at a desired pressure-holding switching position of the injection piston 110, and a second oil discharge port 115B that is not blocked by the injection piston 110 even at the most forward position of the injection piston 110. The first oil discharge port 115A is formed in a side face part of the injection hydraulic cylinder 109, and the second oil discharge port 115B is formed in the end face part of the injection hydraulic cylinder 109.

The first oil discharge port 115A is connected to an oil tank 117 through a flow control valve 116, and has an opening area large enough to discharge the hydraulic oil stored in the front chamber 111B to the oil tank 117 in an injection process. The second oil discharge port 115B is connected to the oil tank 117 through a flow control valve 118, and discharges the hydraulic oil in the front chamber 111B to the oil tank 117 in a pressure-holding process. As long as the hydraulic oil can be flowed at a flow rate in the pressure-holding process and at a flow rate for retreating the injection piston 110 (+X direction) in a measuring process through the second oil discharge port 115B, an opening area of the second oil discharge port 115B may be smaller than that of the first oil discharge port 115A.

Injection molding mainly includes the measuring process, the injection process, and the pressure-holding process. In the metering process, solid molding material is fed into the heating barrel 101 from the hopper 103, and the screw 102 is driven rearward in the axial direction (+X direction) by the injection hydraulic cylinder 109 while being rotationally driven by the motor 108. Thus, the material is sent to the front (−X direction) of the heating barrel 101 inside the heating barrel 101. In the injection process, when a measured value reaches a predetermined value, the screw 102 is driven forward (−X direction) in the axial direction by supplying the pressure oil to the injection hydraulic cylinder 109, and the measured molten material is injected from the nozzle 105 into the cavity 107 of the mold 106. The pressure-holding process is a process of applying pressure to the material in the mold 106 through the material remaining in the heating barrel 101 to compensate for shrinkage caused by cooling of the material after the injection of the material has been finished. By performing these processes, the material can be molded into a desired shape of the cavity 107.

However, it has been found that the injection apparatus 1000 has a problem that an eccentric load is applied to the injection piston 110 when the injection piston 110 decelerates.

Figure 8:
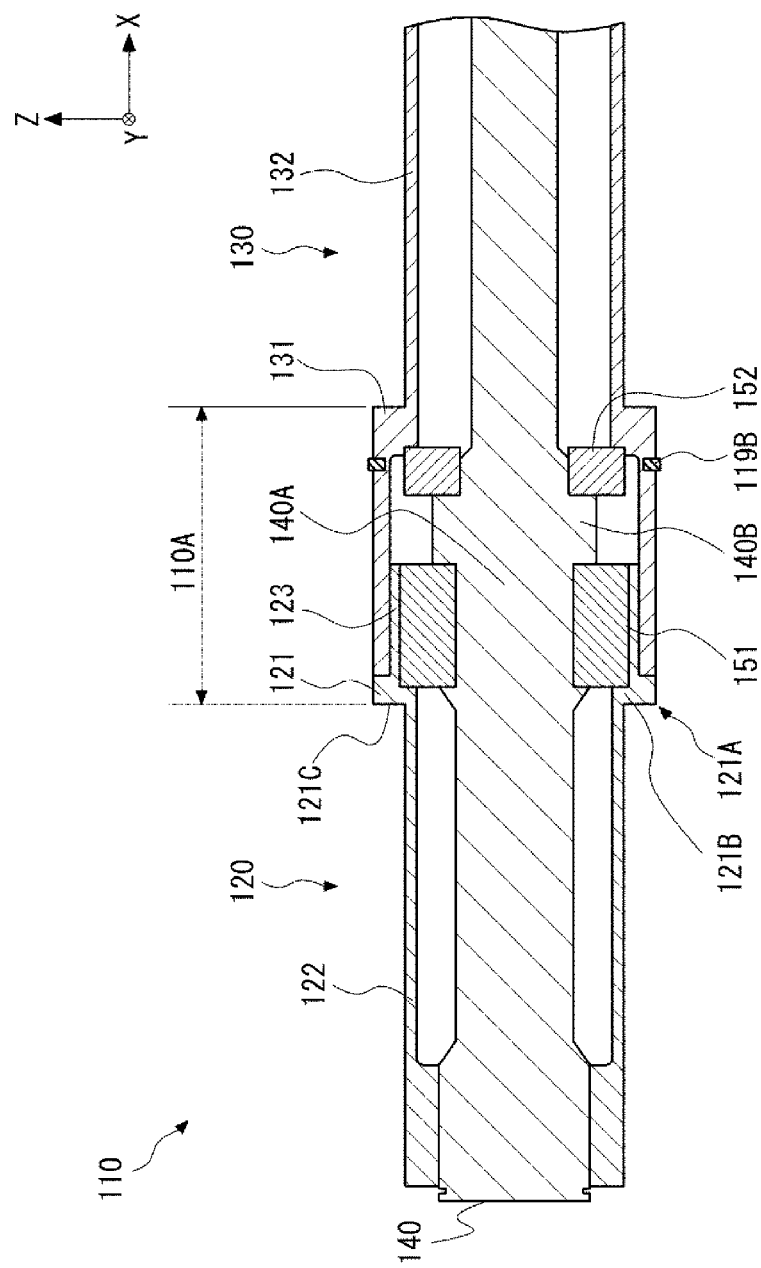
FIG. 8 is a diagram schematically showing a configuration of an injection piston of the general injection apparatus.

FIG. 8 schematically shows a configuration of the injection piston 110 in the injection apparatus 1000. The injection piston 110 includes a front member 120 arranged in the front (−X direction) and a rear member 130 arranged in the rear (+X direction). The front member 120 and the rear member 130 are connected at a piston part 110A that has the largest cross-sectional diameter of the injection piston 110 and is closest to or in contact with the inner surface of the injection hydraulic cylinder 109 (i.e., housing 109A). The front member 120 and the rear member 130 are cylindrical members, and a shaft member 140 is inserted into hollow parts thereof.

A front piston part 121 having the maximum outer diameter is disposed on the rear side (+X direction) of the front member 120. A cylindrical member 122 having an outer diameter smaller than that of the front piston part 121 and extending forward (−X direction), and a fitting member 123 extending rearward (+X direction) are connected to the front piston part 121.

A rear piston part 131 having a cylindrical shape extending in the X direction and having the maximum outer diameter is disposed at a front (+X direction) end of the rear member 130. A cylindrical member 132 having an outer diameter smaller than that of the rear piston part 131 and extending rearward (+X direction) is connected to the rear piston part 131.

A holding part 140A having a relatively large outer shape is disposed at a center of the shaft member 140 in the X direction. A flange part 140B projecting in the radial direction is disposed on the holding part 140A. An angular bearing (angular ball bearing) 151 for receiving a radial force (radial load) is disposed between an inner surface of the front piston part 121 and the fitting member 123, and the holding part 140A to hold a position of the shaft member 140 in the radial direction. A thrust bearing (thrust roller bearing) 152 to bear a force (axial load or thrust load) in the axial direction (X direction) is disposed the front (−X direction) side end of the rear piston part 131 and the flange part 140B. While the shaft member 140 is configured to be movable within a predetermined range along the X direction with respect to the front member 120 and the rear member 130, movement toward the rear (+X direction) is limited by the thrust bearing 152.

The outer diameter of the fitting member 123 and the inner diameter of the rear piston part 131 are sized so that the fitting member 123 can be inserted into the rear piston part 131. Thus, for example, the injection piston 110 can be configured by inserting the shaft member 140 to which the angular bearing 151 is assembled into the rear member 30 to which the thrust bearing 152 is assembled, then covering the shaft member 140 with the front member 120, and fitting the fitting member 123 and the rear piston part 131.

At this time, when viewed in the radial direction (e.g., in the Y-direction or Z direction), since the rear piston part 131 covers the fitting member 123, the joint 110B formed on the outer surface of the piston part 110A is at a position shifted to the front (−X direction) of the piston part 110A.

To prevent leakage of hydraulic oil, sealing members 119A to 119C such as guide rings and oil seals are disposed between the injection piston 110 and the injection hydraulic cylinder 109 (i.e., housing 109A). The sealing member 119A is an annular member fitted to the inner surface of the opening on the −X side of the housing 109A, and is disposed to seal between the inner surface of the housing 109A and the outer surface of the cylindrical member 122 of the front member 120. The sealing member 119B is an annular member fitted to the outer surface of the rear piston part 131 of the rear member 130, and is disposed to seal between the inner surface of the housing 109A and the outer surface of the rear piston part 131. The sealing member 119C is an annular member fitted to the inner surface of the opening on the +X side of the housing 109A, and is disposed to seal between the inner surface of the housing 109A and the outer surface of the cylindrical member 132 of the rear member 130.

Figure 9:
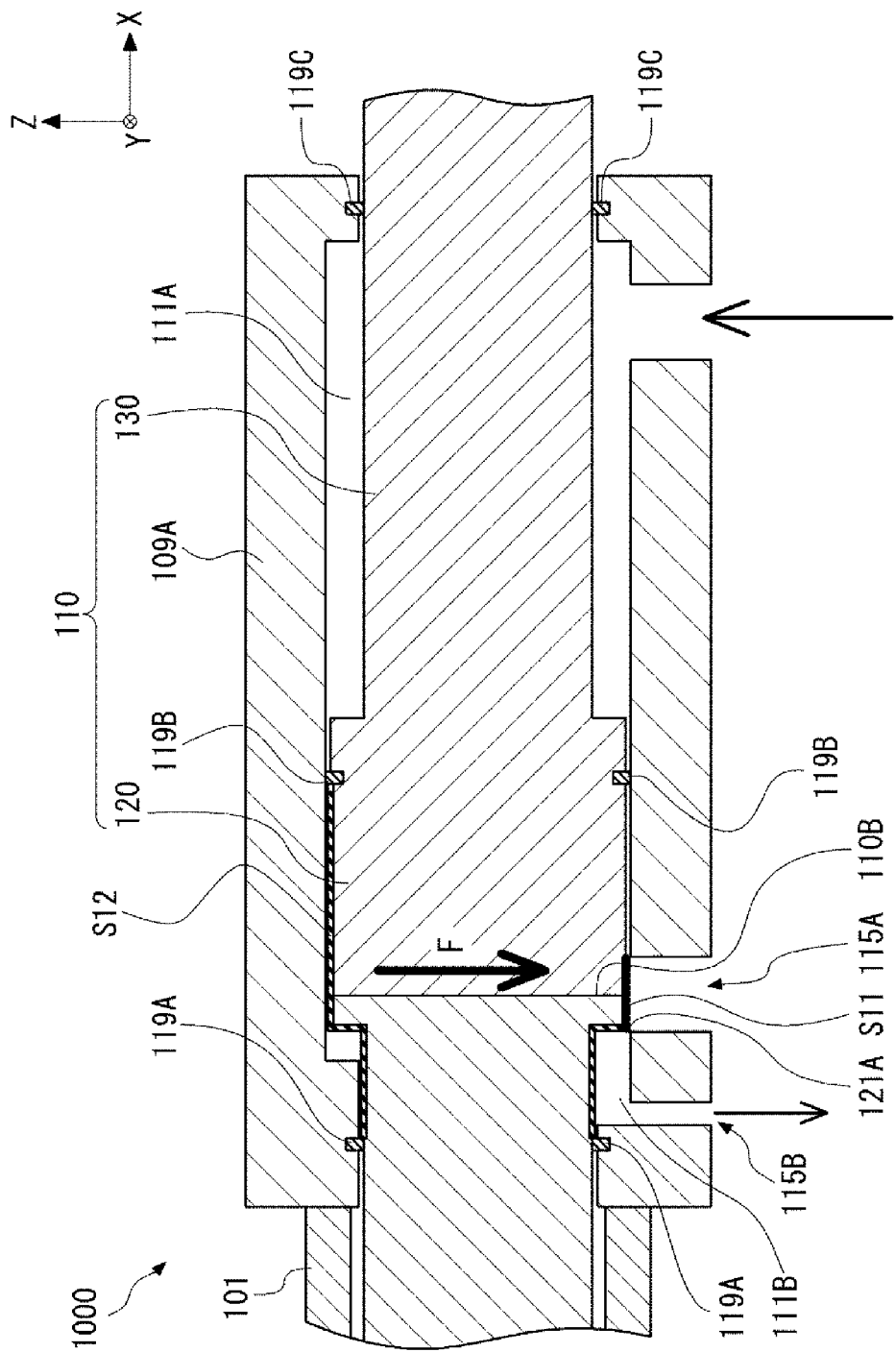
FIG. 9 is a diagram showing a state in which the injection piston of the general injection apparatus blocks a first oil discharge port.

Next, FIG. 9 shows a state in which the injection piston 110 blocks the first oil discharge port 115A. In the injection apparatus 1000, the hydraulic oil is discharged from the first oil discharge port 115A at a large flow rate, and is discharged from the second oil discharge port 115B at a flow rate smaller than the first oil discharge port 115A. When the injection piston 110 advances in the −X direction to completely or substantially block the first oil discharge port 115A, the pressure applied to the side surface part S11 (indicated by thick line) of the side surface of the injection piston 110 decreases rapidly (e.g., down to the atmospheric pressure).

On the other hand, since the hydraulic oil around the injection piston 110 is discharged only through the second oil discharge port 115B having the small flow rate at a place other than the side surface part S11, the pressure of the hydraulic oil becomes high (indicated by thick hatch). As a result, the pressure of the hydraulic oil applied to the side surface part S12 opposed to the side surface part S11 across the central axis of the injection piston 110 becomes high. Thus, an eccentric F directed from the side surface part S12 to the side surface part S11 is applied to the injection piston 110.

At this time, the eccentric load F presses the piston part 110A downward (−Z direction). Therefore, the load is concentrated on the sealing member 119C fitted to the rear piston part 131, which causes deterioration such as uneven wear of the sealing member 119B. Further, when the uneven wear of the sealing member 119B progresses, the piston part 110A cannot be sufficiently held, and the piston part 110A may be displaced downward (−Z direction).

Figure 10:
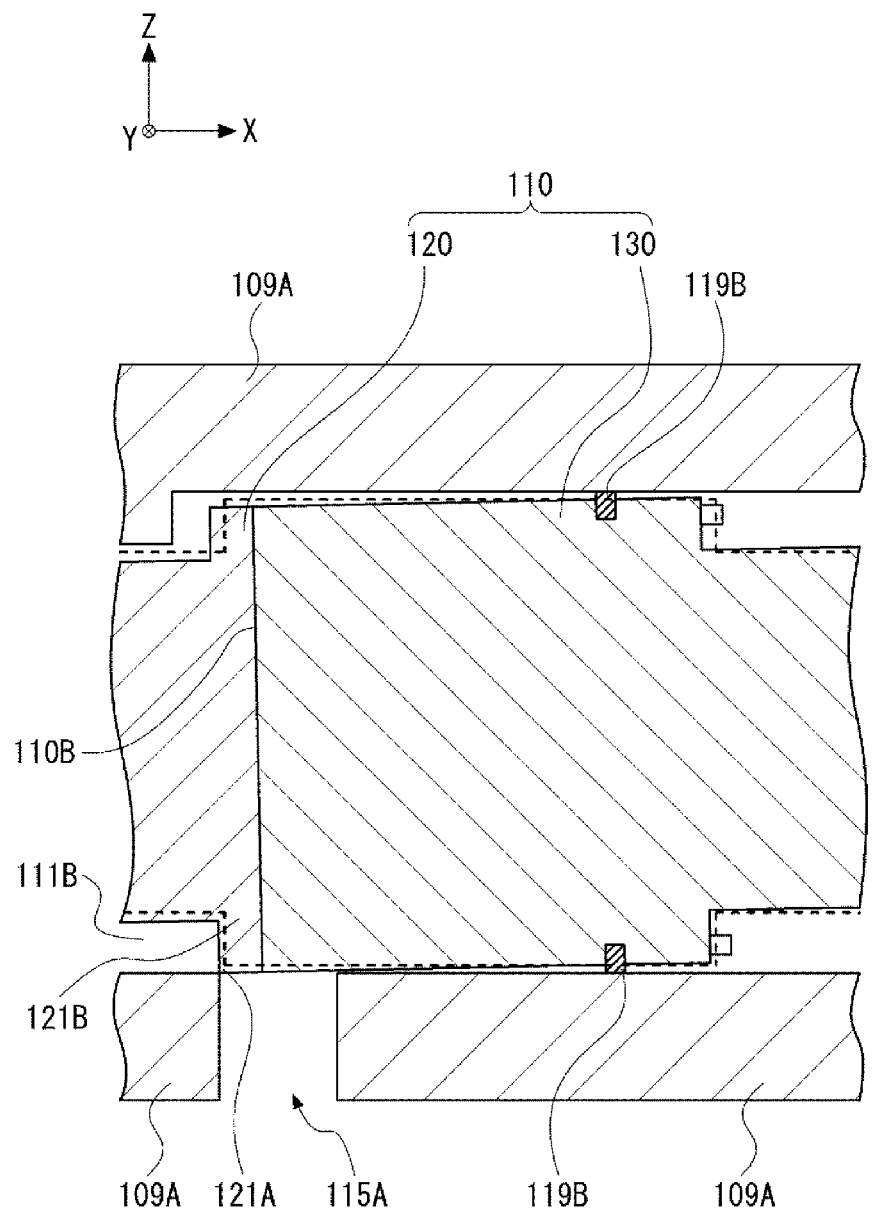
FIG. 10 shows the vicinity of the piston part displaced by an eccentric load.

FIG. 10 shows the vicinity of the piston part displaced by the eccentric load. At this time, when the displacement of the piston part increases, a corner part 121A on the front (−X direction) side of the front piston part 121 may collide with the opening part of the first oil discharge port 115A. In FIG. 10, the outline of the injection piston when there is no displacement is indicated by a broken line. As described above, since the joint 110B is located on the front (−X direction) side of the piston part 110A, that is, in a position close to the collision part, a large force may be applied to the joint 110B.

In the joint 110B, the front piston part 121 and the rear piston part 131 are connected by a connecting means for connecting the two members. For example, a bolt can be used as the connecting means. In this case, the front member 120 and the rear member 130 are connected by forming a female screw (not illustrated) penetrating the front piston part 121 and the rear piston part 131 from a crown surface 121C of the front piston part 121 toward the rear (+X direction), and by screwing the bolt (not illustrated) with a male screw is screwed into the female screw. The bolt is an example of the connecting means, and various connecting means other than the bolt can be used as described later.

As described above, when the front member 120 and the rear member 130 are connected by the connecting means, it can be understood that a large force may be applied to the connecting means since the connecting part 110B is located on the front (−X direction) side of the piston part 110A, that is, in a position close to the collision part.

Further, since the collision part is also close to the connection part 121B between the front piston part 121 and the cylindrical member 122 having different diameters and the material of the connection part is relatively thin, the large force may be applied to the thin part.

Hereinafter, an injection apparatus of a metal injection molding machine capable of preventing a large force from being applied to a joint of an injection piston will be described.

FIG. 1 is a diagram showing a schematic configuration of an injection apparatus of a metal injection molding machine according to a first embodiment. An injection apparatus 100 shown in FIG. 1 includes a heating barrel 1 and a screw 2 disposed in the heating barrel 1 to be freely driven in an axial direction and a rotational direction. Molding material is charged into the heating barrel 1 from a hopper 3, and the charged material is molten by frictional heat, shear heat generated due to rotation of the screw 2, and heat applied from a heater 4 disposed on the outer periphery of the heating barrel 1. The molten material is kneaded by the rotation of the screw 2 and sent to the front (−X direction) of the heating barrel 1. A nozzle 5 is attached to a tip of the heating barrel 1. When the material is injected, the molten molding material held at the tip of the heating barrel 1 is injected through the nozzle 5 into a cavity 7 of a mold 6 that is closed.

The screw 2 is rotationally driven by a motor 8 and axially driven by an injection piston 10 disposed in an injection hydraulic cylinder 9.

The injection hydraulic cylinder 9 is partitioned into two chambers by the injection piston 10, a front chamber 11B (Also referred to as a second chamber) is disposed in the front (−X direction), and a rear chamber 11A (also referred to as a first chamber) is disposed in the rear (+X direction). The pressure oil accumulated in the accumulator 13 is supplied to the rear chamber 11A through a flow control valve 14 by a hydraulic pump 12.

In FIGS. 1 to 10, a direction from the front chamber 11B to the rear chamber 11A along the central axis of the injection piston 10 is defined as the X direction, a direction normal to the plane of the drawings and from the front to the back of the drawings is defined as the Y direction, and the vertical direction from the bottom to the top of the drawings is defined as the Z direction.

Figure 2:
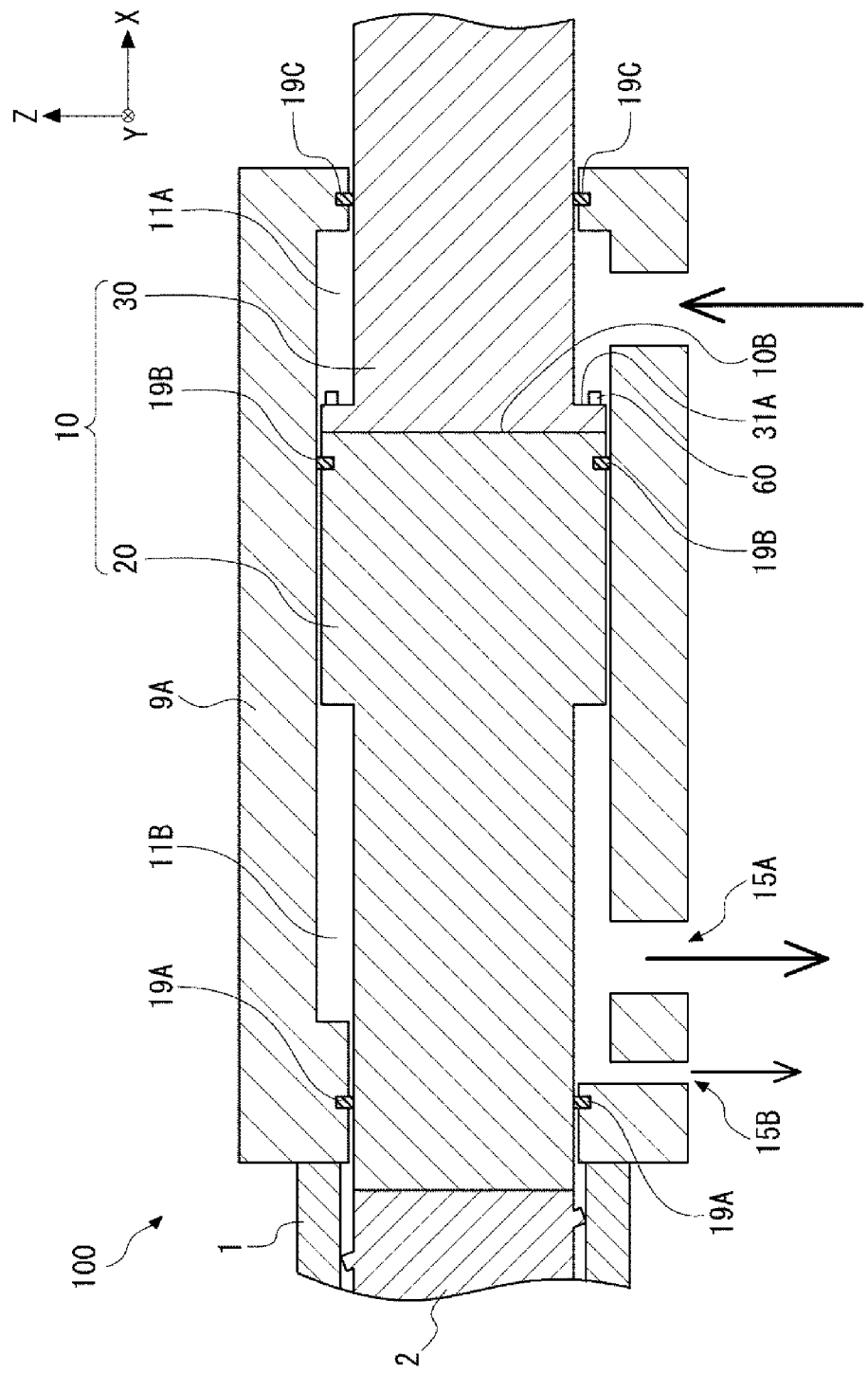
FIG. 2 is an enlarged view near a front chamber of the injection apparatus according to the first embodiment.

The configuration of the front chamber 11B will be specifically described below. FIG. 2 is an enlarged view of the vicinity of the front chamber 11B of the injection apparatus 100. In the front chamber 11B, a first oil discharge port 15A that is completely or mostly blocked by the injection piston 10 at a desired pressure-holding switching position of the injection piston 10, and a second oil discharge port 15B that is not blocked by the injection piston 10 even at the most forward position of the injection piston 10.

The first oil discharge port 15A is connected to an oil tank 17 through a flow control valve 16, and has an opening area large enough to discharge the hydraulic oil stored in the front chamber 11B to the oil tank 17 in an injection process described later.

The second oil discharge port 15B is formed on an end surface of the injection hydraulic cylinder 9. The second oil discharge port 15B is connected to the oil tank 17 through a flow control valve 18, and discharges the hydraulic oil in the front chamber 11B to the oil tank 17 in a pressure-holding process described later. As long as the hydraulic oil can be flowed at a flow rate in the pressure-holding process and at a flow rate for retreating the injection piston 10 in the +X direction in a measuring process through the second oil discharge port 15B, an opening area of the second oil discharge port 15B may be smaller than that of the first oil discharge port 15A. For example, the opening area of the second oil discharge port 15B may be 1/10 or less of the opening area of the first oil discharge port 15A.

Figure 3:
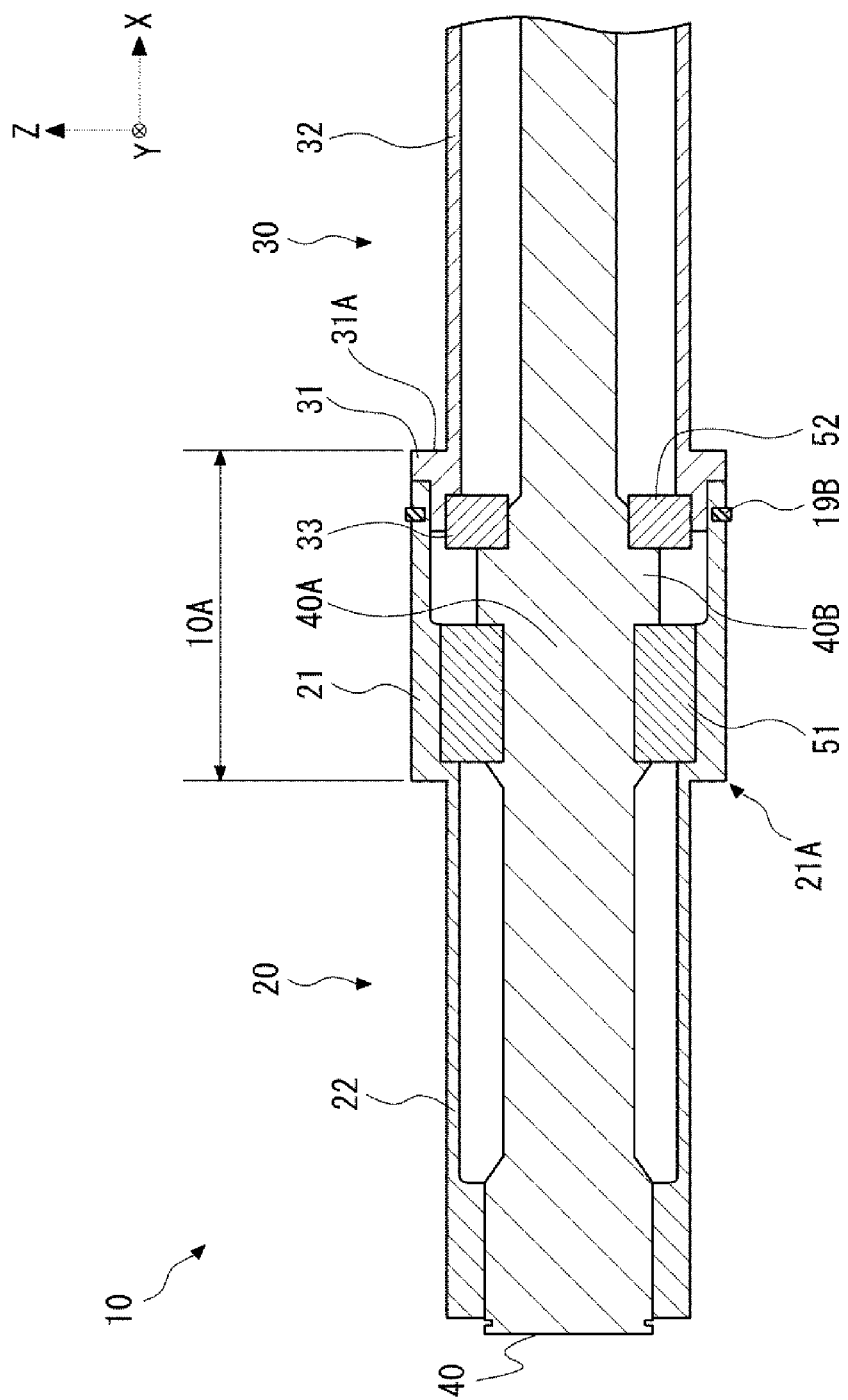
FIG. 3 is a diagram schematically showing a configuration of an injection piston according to the first embodiment.

Next, the injection piston 10 will be described in detail. FIG. 3 schematically shows a configuration of the injection piston 10 according to the first embodiment.

The injection piston 10 includes a front member 20 (Also referred to as a second member) arranged in the front (-X direction) and a rear member 30 (also referred to as a first member) arranged in the rear (+X direction). The front member 20 and the rear member 30 are connected at a piston part 10A that has the largest cross-sectional diameter of the injection piston 10 and is closest to or in contact with the inner surface of the injection hydraulic cylinder 9 (i.e., housing 9A). The front member 20 and the rear member 30 are cylindrical members, and a shaft member 40 is inserted into hollow parts thereof.

A front piston part 21 that is a cylindrical member extending in the X direction and has the maximum outer diameter is disposed on the rear (+X direction) side of the front member 20. A cylindrical member 22 having an outer diameter smaller than that of the front piston part 21 and extending forward (-X direction) is connected to the front piston part 21.

A rear piston part 31 having the maximum outer diameter is disposed on the front (-X direction) side of the rear member 30. A cylindrical member 32 having an outer diameter smaller than that of the rear piston part 31 and extending backward (+X direction), and a fitting member 33 extending forward (-X direction) are connected to the rear piston part 31.

A holding part 40A having a relatively large outer shape is disposed at a center of the shaft member 40 in the X direction. A flange part 40B projecting in the radial direction is disposed in the holding part 40A. An angular bearing (angular ball bearing) 51 for receiving a radial force (radial load) is disposed between an inner surface of the front piston part 21 and the holding part 40A to hold a position of the shaft member 40 in the radial direction. A thrust bearing (thrust roller bearing) 52 for receiving a force (axial load or thrust load) in the axial direction (X direction) is disposed between the front (-X direction) side end of the rear piston part 31 and the flange part 40B. While the shaft member 40 is configured to be movable within a predetermined range along the X direction with respect to the front member 20 and the rear member 30, movement toward the rear (+X direction) is limited by the thrust bearing 52.

The outer diameter of the fitting member 33 and the inner diameter of the front piston part 21 are sized so that the fitting member 33 can be inserted into the front piston part 21. Thus, for example, the injection piston 10 can be configured by inserting the shaft member 40 to which an angular the bearing 51 is assembled into a rear member 30 to which the thrust bearing 52 is assembled, then covering the shaft member 40 with the front member 20 and fitting the fitting member 33 and the front piston part 21.

The front member 20 and the rear member 30 are connected by forming a female screw (not illustrated) penetrating the rear piston part 31 and the front piston part 21 from a crown surface 31A of the rear piston part 31 toward the front (-X direction), and by screwing a bolt 60 with a male screw is screwed into the female screw.

In this configuration, when viewed in the radial direction (e.g., in the Y direction or the Z direction), since the front piston part 21 covers the fitting member 33, the joint 10B formed on the outer surface of the piston part 10A is at a position shifted toward the rear (+X direction) of the piston part 10A.

To prevent leakage of hydraulic oil, sealing members 19A to 19 C such as guide rings and oil seals are disposed between the injection piston 10 and the injection hydraulic cylinder 9 (i.e., housing 9A). The sealing member 19A is an annular member fitted to the inner surface of the opening on the -X side of the housing 9A, and is disposed to seal between the inner surface of the housing 9A and the outer surface of the cylindrical member 22 of the front member 20. The sealing member 19B is an annular member fitted to the outer surface of the rear piston part 31 of the rear member 30, and is disposed to seal between the inner surface of the housing 9A and the outer surface of the rear piston part 31. The sealing member 19C is an annular member fitted to the inner surface of the opening on the +X side of the housing 9A, and is disposed to seal between the inner surface of the housing 9A and the outer surface of the cylindrical member 32 of the rear member 30.

Next, injection molding by the injection apparatus 100 will be described. Injection molding mainly includes the measuring process, the injection process and a pressure holding process. Hereinafter, each process will be described.

The measuring process is a process of measuring the material to be filled into the cavity. In this process, solid molding material is fed into the heating barrel 1 from the hopper 3, and the screw 2 is driven rearward in the axial direction (+X direction) by the injection hydraulic cylinder 9 while being rotationally driven by the motor 8. Thus, the material is sent the forward of the screw 2 in a molten state in the heating barrel 1. By measuring the movement amount of the screw 2, the material fed into the heating barrel 1 can be measured.

The injection process is a process of filling the cavity 7 with the material. In the injection process, when a measured value reaches a predetermined value, the screw 2 is driven forward in the axial direction by supplying the pressure oil to the injection hydraulic cylinder 9, and the measured molten material is injected from the nozzle 5 into the cavity 7 of the mold 6. When the alloy material is injection-molded, if the molten material is not injected at a relatively high speed, the molten metal is rapidly cooled and filling of the cavity 7 becomes insufficient.

Therefore, in the general injection molding for metallic materials, the accumulator 13 is used as a pressure oil supply source to the injection hydraulic cylinder 9, and the screw 2 is driven at a high speed (e.g., 1 to 5 m/s) in the axial direction to inject the molten material.

The pressure-holding process is a process of applying pressure to the material filled in the cavity 7 by maintaining the pressure applied to the material remaining in the heating barrel 1 after injection of the material to compensate for shrinkage caused by cooling of the material. Thereafter, the material in the cavity 7 is cooled while applying the maintained pressure. Thus, the material can be formed into a desired shape of the cavity 7.

At this time, since, if the switching from the injection process to the pressure-holding process is performed too early, the filling of the material into the cavity 7 becomes insufficient, a shortshot (insufficient filling) and sink marks occur in the molded product. If the switching from the injection process to the pressure-holding process is too late, the material is excessively filled into the cavity 7, burrs are generated and the durability of the injection apparatus 100 and that of the mold 6 are deteriorated. Therefore, in the injection molding, it is required that the pressure-holding switching position at the end of the injection is kept constant.

The operation at the time of transition from the injection process to the pressure holding process in the present embodiment will be specifically described below. In the present embodiment, when the pressure oil is supplied from the accumulator 13 to the rear chamber 11A of the injection hydraulic cylinder 9 in the injection process, the injection piston 10 advances in the injection direction (−X direction) while the hydraulic oil is discharged from the first oil discharge port 15A of the front chamber 11B. Thereafter, when the injection piston 10 reaches the pressure-holding switching position, the first oil discharge port 15A is completely or substantially blocked by the injection piston 10.

In this configuration, when the first oil discharge port 15A is blocked by the injection piston 10 (When the injection piston 10 reaches the pressure-holding switching position) at any injection speed, the discharge of the hydraulic oil from the front chamber 11B is limited, and brake pressure (indicated by a dashed line) is immediately generated. Thus, the injection piston 10 can be rapidly decelerated. The switching position (pressure-holding switching position) from the injection process to the pressure-holding process can be a fixed position where the injection piston 10 blocks the first oil discharge port 15A.

Since the pressure-holding switching position is the fixed position, a timing of the pressure-holding switching for the molded article can be controlled by adjusting a measuring completion position.

Further, by setting a discharge flow rate of the flow rate control valve 18 to a value capable of realizing the pressure to be held in the pressure-holding process, after the deceleration of the injection piston 10, the hydraulic oil can be discharged from the second oil discharge port 15B by a desired flow rate through the flow rate control valve 18. Thus, the pressure of the pressure oil supplied to the rear chamber 11A can be controlled to smoothly switch from the injection process to the pressure-holding process. The flow rate of discharge of the hydraulic oil from the second oil discharge port 15B may be adjusted by appropriately setting the number of the second oil discharge port 15B and the opening area of the second oil discharge port 15B instead of using the flow control valve 18 as described above.

Figure 4:
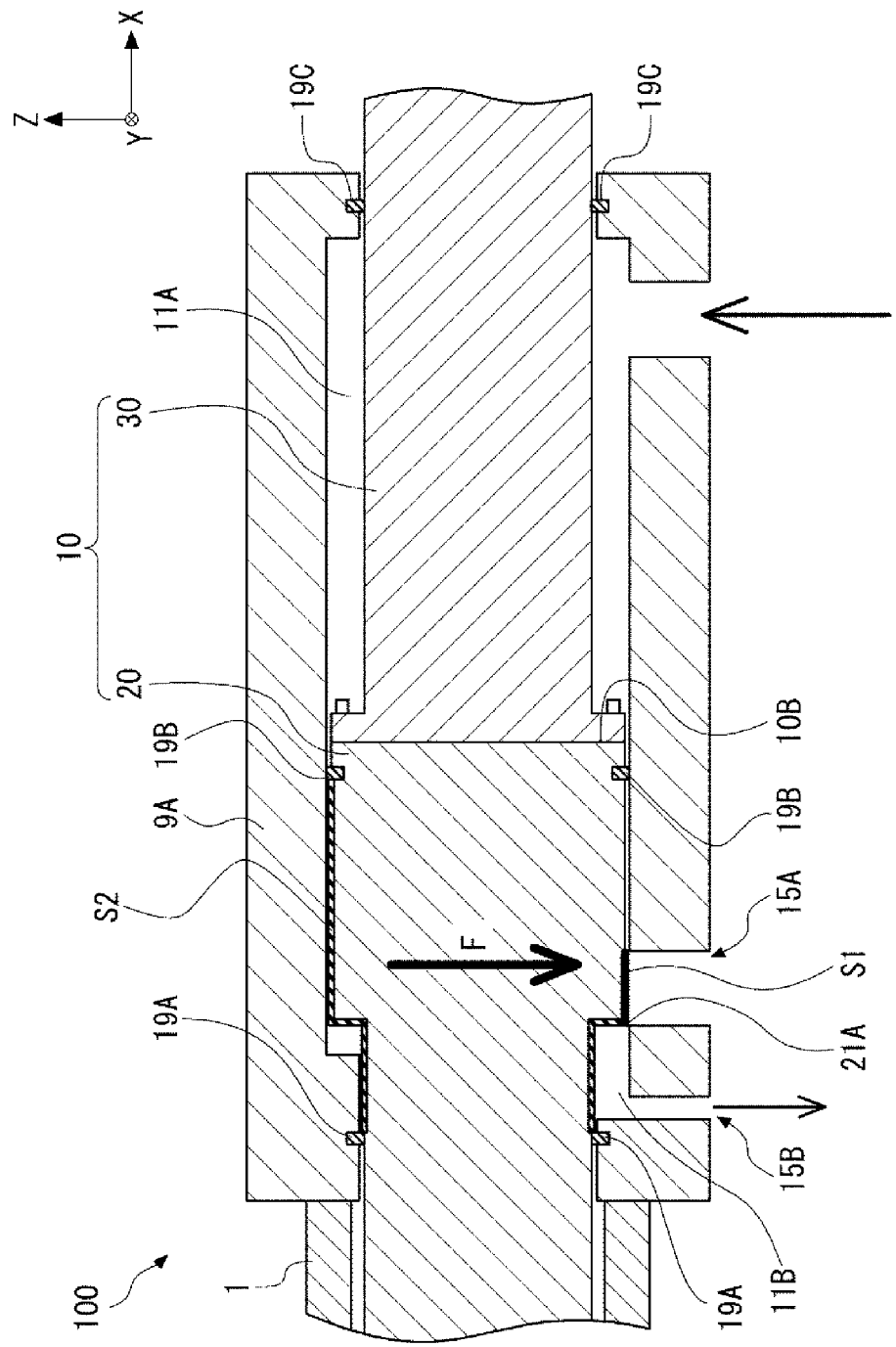
FIG. 4 is a diagram showing a state in which the injection piston according to the first embodiment blocks a first oil discharge port.

Next, prevention the injection piston 10 in this configuration from being damaged will be described. FIG. 4 shows a state in which the injection piston 10 blocks the first oil discharge port 15A. As described above, the hydraulic oil is discharged from the first oil discharge port 15A at the large flow rate, and is discharged from the second oil discharge port 15B at the flow rate smaller than that of the first oil discharge port 15A. Therefore, as shown in FIG. 4, when the injection piston 10 is advanced in the −X direction and the first oil discharge port 15A is completely or substantially blocked, the pressure applied to a side surface part S1 (indicated by a thick line, also referred to as a first surface) of the side surface of the injection piston 10 exposed to the first oil discharge port 15A rapidly decreases (e.g., down to the atmospheric pressure).

On the other hand, since the hydraulic oil around the injection piston 10 is discharged only through the second oil discharge port 15B having the small flow rate at a place other than the side surface part S1, the pressure of the hydraulic oil becomes high (indicated by thick hatch, also referred to as a second surface). As a result, the pressure of the hydraulic oil applied to a side surface part S2 opposed to the side surface part S1 across the central axis of the injection piston 10 becomes high. Thus, an eccentric load F directed from the side surface part S2 to the side surface part S1 is applied to the injection piston 10. In other words, when the axial direction of the injection piston 10 (X direction) is used as a reference, it can be understood that the eccentric load F is a shear force or a force applied in a yaw direction with respect to the injection piston 10.

At this time, the eccentric load F presses the piston part 10A downward (−Z direction). Therefore, a load is concentrated on the sealing member 19B fitted to the rear piston part 31, and uneven wear of the sealing member 19B may occur. Further, when the uneven wear of the sealing member 19B progresses, it is conceivable that the piston part 10A cannot be sufficiently held, and the piston part 10A is displaced downward (−Z direction). Due to the displacement at this case, it can be assumed that the injection piston 10 moves in parallel in the Y direction or the injection piston 10 rotates around a direction (e.g., Y direction) orthogonal to the axial direction (X direction), that is, yawing occurs.

Figure 5:
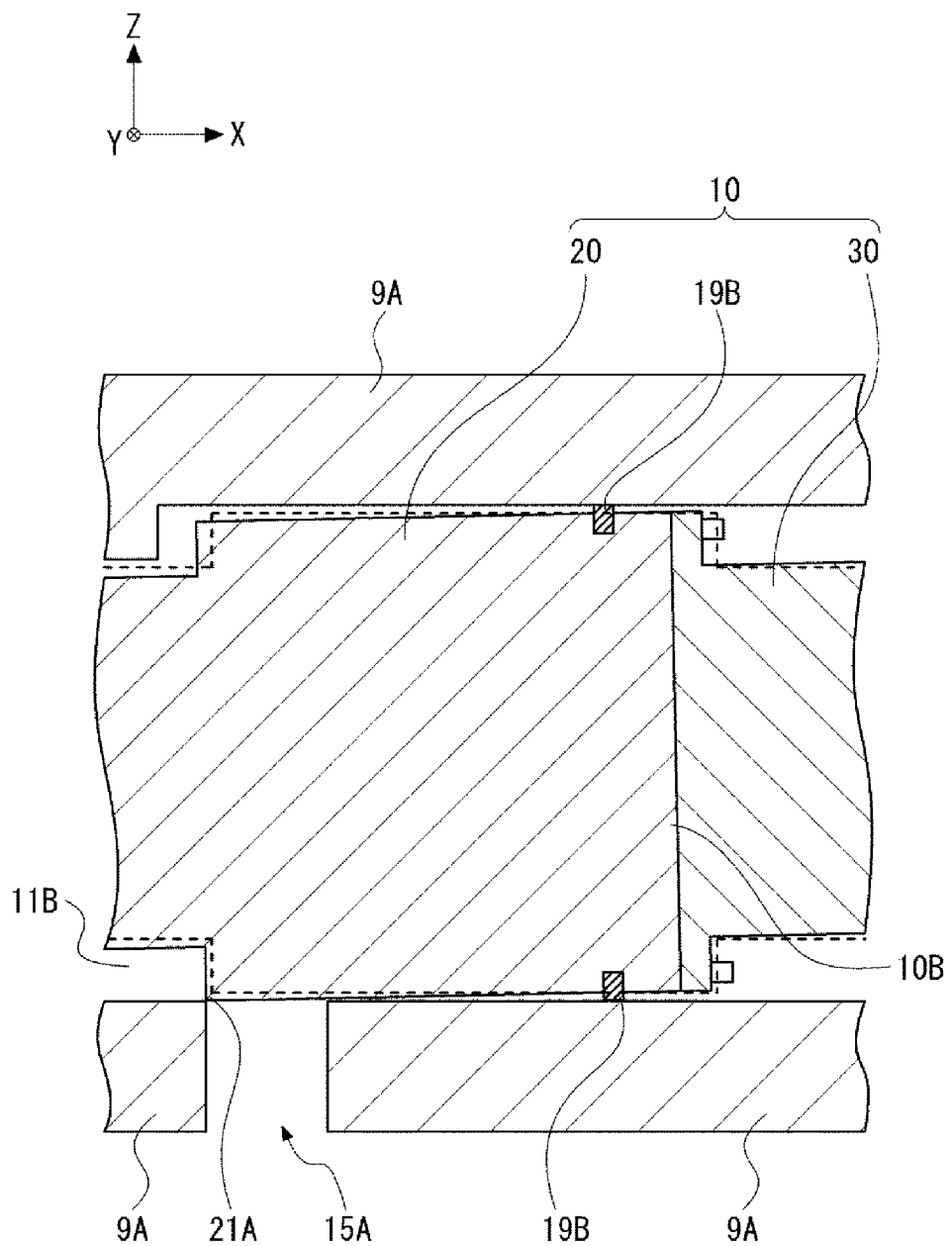
FIG. 5 is a diagram showing a near area of a piston part displaced by the eccentric load in the injection apparatus according to the first embodiment.

FIG. 5 shows the vicinity of the piston part displaced by the eccentric load. When the displacement of the piston part 10A is increased, a corner part 21A on the front (−X direction) side of the front piston part 21 may collide with the opening of the first oil discharge port 15A and the inner surface of the housing 9A. In FIG. 5, the outline of the injection piston when there is no displacement is indicated by a dashed line. However, in this configuration, since the joint 10B exists on the rear (+X direction) side of the piston part 10A, that is, at a position apart from the collision part, it is considered that even if a force is applied at the time of collision, there is no influence on the joint 10B or the influence is small. Therefore, it is possible to prevent the joint 10B from being damaged.

In this configuration, since the joint 10B is not exposed to the first oil discharge port 15A, it is possible to prevent the joint 10B from being loaded by the pressure difference. Thus, the joint 10B is advantageous from the viewpoint of preventing breakage.

As described above, according to this configuration, even when the front piston part 21 contacts the housing 9A due to the uneven wear of the sealing member 19B, it is possible to prevent the injection piston 10 configured by connecting the two members from being damaged.

Other Embodiments

The present disclosure is not limited to the above-described embodiments, and can be appropriately changed without departing from the scope of the present disclosure. For example, in the above embodiments, it has been described that the front member 20 and the rear member 30 are connected by the bolt, and, however, the connection method is not limited thereto. A female screw may be formed on the inner surface of the front piston part 21, a male screw may be formed on the outer surface of the fitting member 33, and the fitting member 33 may be screwed into the front piston part 21 to connect the front member 20 and the rear member 30. Further, the front piston part 21 and the fitting member 33 may be welded or bonded to each other with an adhesive, thereby connecting the front member 20 and the rear member 30. From the disclosure thus described, it will be obvious that the embeds of the disclosure may be varied in many ways.

Such variations are not to be registered as a departure from the spirit and scope of the disclosure, and all such modifications as would be impossible to one skilled in the art are intended for inclusion within the scope of the following claims.

What is claimed is:

1. An injection apparatus comprising:
an injection piston connected to a screw disposed in a heating barrel to be movable and rotatable along an axial direction of the heating barrel and configured to drive the screw along the axial direction;
an injection hydraulic cylinder configured to drive the injection piston in the axial direction by pressure of hydraulic oil, and configured to be partitioned into a first chamber to which hydraulic oil pressured in order to drive the injection piston is supplied and a second chamber from which hydraulic oil is discharged, the first chamber driving the injection piston in the axial direction by hydraulic pressure;
a first oil discharge port configured to discharge the hydraulic oil from the second chamber, the first oil discharge port being disposed in the injection hydraulic cylinder to be blocked by a piston part when the piston part of the injection piston advances to a pressure-holding switching position; and
a second oil discharge port disposed in the injection hydraulic cylinder to discharge the hydraulic oil from the second chamber regardless of the position of the injection piston, wherein
the injection piston comprises:
a first member disposed on a side of the first chamber and extending in the axial direction; and
a second member disposed on a side of the second chamber, directly connected to the first member in the piston part, and extending in the axial direction,
a joint between the first member and the second member is disposed in the piston part at a position that is separated from an end of the piston part along the axial direction such that, when the piston part of the injection piston advances to the pressure-holding switching position, the joint is not exposed to the first oil discharge port,
the injection piston and the joint are disposed in the injection hydraulic cylinder.

2. The injection apparatus according to claim 1, wherein, when the piston part of the injection piston advances to the pressure-holding switching position and the first oil discharge port is blocked by the piston part, pressure applied to a first surface exposed to the first oil discharge port of the piston part is lower than pressure applied to a second surface of the piston part opposed to the first oil discharge port, and
an eccentric load due to a pressure difference between the pressure applied to the first surface and the pressure applied to the second surface is applied to the piston part.

3. The injection apparatus according to claim 2, wherein a gap between an end of the piston part on a side of the second chamber and the injection hydraulic cylinder becomes smaller than a gap between an end of the piston part on a side of the first chamber and the injection hydraulic cylinder by the partial load.

4. The injection apparatus according to claim 3, wherein a sealing member configured to seal a space between the piston part and an inner surface of the injection hydraulic cylinder is disposed on an outer periphery of the piston part in a plane normal to the axial direction, and
a gap between the piston part on the side of the second chamber with respect to the sealing member becomes smaller than a gap between the piston part on the side of the first chamber with respect to the sealing member and the injection hydraulic cylinder.

5. The injection apparatus according to claim 1, wherein the joint is disposed on the side of the first chamber with respect to a center of the piston part in the axial direction.

6. The injection apparatus according to claim 1, wherein the first member and the second member are configured in such a manner that an end of one member fits an end of the other member.

7. The injection apparatus according to claim 6, wherein the first member and the second member are connected by screwing members with male screws into female screws formed in the first member and the second member.

8. The injection apparatus according to claim 6, wherein the first member and the second member are connected by screwing a male screw formed in one member into a female screw formed in the other member.

9. The injection apparatus according to claim 1, wherein the first member and the second member are connected by welding or bonding.

* * * * *